(12) United States Patent
Smith et al.

(10) Patent No.: US 11,531,648 B2
(45) Date of Patent: Dec. 20, 2022

(54) MAINTAINING AND UPDATING FILE SYSTEM SHADOWS ON A LOCAL DEVICE BY A SYNCHRONIZATION CLIENT OF A CLOUD-BASED PLATFORM

(71) Applicant: Box, Inc., Redwood City, CA (US)

(72) Inventors: Benjamin Campbell Smith, Mountain View, CA (US); David Mackenzie, Daly City, CA (US); Yiming Lu, Los Altos, CA (US); Peter Potrebic, Calistoga, CA (US); Florian Jourda, San Francisco, CA (US); Kunal Parmar, San Jose, CA (US)

(73) Assignee: Box, Inc., Redwood City, CA (US)

( * ) Notice: Subject to any disclaimer, the term of this patent is extended or adjusted under 35 U.S.C. 154(b) by 917 days.

(21) Appl. No.: 15/725,049

(22) Filed: Oct. 4, 2017

(65) Prior Publication Data

US 2018/0046644 A1     Feb. 15, 2018

Related U.S. Application Data

(63) Continuation of application No. 14/312,482, filed on Jun. 23, 2014, now Pat. No. 9,805,050.
(Continued)

(51) Int. Cl.
*G06F 7/00*      (2006.01)
*G06F 16/178*    (2019.01)

(52) U.S. Cl.
CPC .................. *G06F 16/178* (2019.01)

(58) Field of Classification Search
CPC .... G06F 16/178; G06F 16/27; G06F 16/1873; G06F 16/10; G06F 16/128; G06F 16/2365
See application file for complete search history.

(56) References Cited

U.S. PATENT DOCUMENTS

| 858,619 A | 7/1907 | O'Farrell |
|---|---|---|
| 5,043,876 A | 8/1991 | Terry |

(Continued)

FOREIGN PATENT DOCUMENTS

| CA | 2724521 A1 | 11/2009 |
|---|---|---|
| CN | 101997924 A | 3/2011 |

(Continued)

OTHER PUBLICATIONS

"Agilewords—Features, Powerful Features Yet Simple," Jun. 1, 2011, http://web.archive.org/web/20110601223756/http://agilewords.com/product/features, 3 pages.
(Continued)

*Primary Examiner* — Daniel A Kuddus
(74) *Attorney, Agent, or Firm* — Sheridan Ross P.C.

(57) ABSTRACT

Systems and methods for maintaining and updating file system shadows by a synchronization client of a cloud-based platform. In some embodiments, an executor of the synchronization client can execute an action on an item in the local file system which changes the state of the item from an old state to a new state. The synchronization client updates the file system shadows with the new state of the item via an interface to facilitate generation of a synchronization event for the change to the item, that would otherwise go undetected if the change to the item was immediately reversed. In some embodiments, methods for providing shadow consistency and enhancing concurrent access to shadows are implemented by the synchronization client in maintaining and updating the file system shadows.

20 Claims, 12 Drawing Sheets

Related U.S. Application Data

(60) Provisional application No. 61/838,176, filed on Jun. 21, 2013.

(56) References Cited

U.S. PATENT DOCUMENTS

| | | | |
|---|---|---|---|
| 5,748,735 A | 5/1998 | Ganesan | |
| 5,774,717 A | 6/1998 | Porcaro | |
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,926,816 A | 7/1999 | Bauer et al. | |
| 5,999,908 A | 12/1999 | Abelow | |
| 6,016,467 A | 1/2000 | Newsted et al. | |
| 6,034,621 A | 3/2000 | Kaufman | |
| 6,055,543 A | 4/2000 | Christensen et al. | |
| 6,073,161 A | 6/2000 | DeBoskey et al. | |
| 6,098,078 A | 8/2000 | Gehani et al. | |
| 6,226,618 B1 | 5/2001 | Downs et al. | |
| 6,233,600 B1 | 5/2001 | Salas et al. | |
| 6,260,040 B1 | 7/2001 | Kauffman et al. | |
| 6,279,109 B1 | 8/2001 | Brundridge | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,441,641 B1 | 8/2002 | Pang et al. | |
| 6,446,091 B1 | 9/2002 | Noren et al. | |
| 6,449,622 B1 | 9/2002 | LaRue et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,636,897 B1 | 10/2003 | Sherman et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,003,667 B1 | 2/2006 | Slick et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,080,104 B2 | 7/2006 | Ring et al. | |
| 7,130,831 B2 | 10/2006 | Howard et al. | |
| 7,133,834 B1 | 11/2006 | Abelow | |
| 7,143,136 B1 | 11/2006 | Drenan et al. | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,171,468 B2 | 1/2007 | Yeung et al. | |
| 7,178,021 B1 | 2/2007 | Hanna et al. | |
| 7,222,078 B2 | 5/2007 | Abelow | |
| 7,233,997 B1 | 6/2007 | Leveridge et al. | |
| 7,275,244 B1 | 9/2007 | Charles Bell et al. | |
| 7,296,025 B2 | 11/2007 | Kung et al. | |
| 7,310,684 B2 | 12/2007 | Patrick et al. | |
| 7,337,193 B1 | 2/2008 | Mills et al. | |
| 7,346,778 B1 | 3/2008 | Guiter et al. | |
| 7,353,252 B1 | 4/2008 | Design | |
| 7,362,868 B2 | 4/2008 | Madoukh et al. | |
| 7,363,330 B1 | 4/2008 | Ellman et al. | |
| 7,370,269 B1 | 5/2008 | Prabhu et al. | |
| 7,380,120 B1 | 5/2008 | Garcia | |
| 7,386,535 B1 | 6/2008 | Kalucha et al. | |
| 7,401,117 B2 | 7/2008 | Dan et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,653,668 B1 | 1/2010 | Shelat et al. | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,735,144 B2 | 6/2010 | Pravetz et al. | |
| 7,739,411 B2 | 6/2010 | Messer et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 | 2/2011 | Davda | |
| 7,886,295 B2 | 2/2011 | Burger et al. | |
| 7,890,964 B2 | 2/2011 | Vogler-Ivashchanka et al. | |
| 7,937,663 B2 | 5/2011 | Parker et al. | |
| 7,958,353 B2 | 6/2011 | Matsuzaki et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,117,261 B2 | 2/2012 | Briere et al. | |
| 8,126,848 B2 | 2/2012 | Wagner | |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,200,582 B1 | 6/2012 | Zhu | |
| 8,201,230 B2 | 6/2012 | Day et al. | |
| 8,214,747 B1 | 7/2012 | Yankovich et al. | |
| 8,230,348 B2 | 7/2012 | Peters et al. | |
| 8,239,918 B1 | 8/2012 | Cohen | |
| 8,326,814 B2 | 12/2012 | Ghods et al. | |
| 8,347,276 B2 | 1/2013 | Schadow | |
| 8,358,701 B2 | 1/2013 | Chou et al. | |
| 8,370,803 B1 | 2/2013 | Holler et al. | |
| 8,429,540 B1 | 4/2013 | Yankovich et al. | |
| 8,447,820 B1 | 5/2013 | Gay | |
| 8,458,128 B2 | 6/2013 | Khosravy et al. | |
| 8,464,161 B2 | 6/2013 | Giles et al. | |
| 8,464,167 B2 | 6/2013 | Saund et al. | |
| 8,473,775 B1 | 6/2013 | Helmick et al. | |
| 8,515,902 B2 | 8/2013 | Savage | |
| 8,527,549 B2 | 9/2013 | Cidon | |
| 8,528,087 B2 | 9/2013 | Hsu et al. | |
| 8,549,066 B1 | 10/2013 | Donahue et al. | |
| 8,549,511 B2 | 10/2013 | Seki et al. | |
| 8,572,022 B2 | 10/2013 | Hagan et al. | |
| 8,582,777 B2 | 11/2013 | Urivskiy et al. | |
| 8,583,619 B2 | 11/2013 | Ghods et al. | |
| 8,607,306 B1 | 12/2013 | Bridge et al. | |
| 8,650,498 B1 | 2/2014 | Mihovilovic | |
| 8,719,445 B2 | 5/2014 | Ko | |
| 8,719,810 B2 | 5/2014 | Oh | |
| 8,745,267 B2 | 6/2014 | Luecke et al. | |
| 8,775,378 B2 * | 7/2014 | Cisler | G06F 11/1466 707/646 |
| 8,782,637 B2 | 7/2014 | Khalid | |
| 8,819,068 B1 | 8/2014 | Knote et al. | |
| 8,825,597 B1 | 9/2014 | Houston et al. | |
| 8,849,955 B2 | 9/2014 | Prahlad et al. | |
| 8,868,574 B2 | 10/2014 | Kiang et al. | |
| 8,869,235 B2 | 10/2014 | Qureshi et al. | |
| 8,886,925 B2 | 11/2014 | Qureshi et al. | |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,179 B2 | 2/2015 | Besen et al. | |
| 8,949,939 B2 | 2/2015 | Peddada | |
| 8,955,103 B2 | 2/2015 | Kline, III et al. | |

(56) References Cited

U.S. PATENT DOCUMENTS

| | | |
|---|---|---|
| 8,956,103 B2 | 2/2015 | Gehring |
| 8,959,579 B2 | 2/2015 | Barton et al. |
| 8,966,062 B1 | 2/2015 | Giese et al. |
| 8,977,594 B2 * | 3/2015 | Whitehead .............. H04L 67/01 707/639 |
| 8,990,307 B2 | 3/2015 | Barreto et al. |
| 8,990,955 B2 | 3/2015 | Hymel et al. |
| 9,009,115 B2 * | 4/2015 | Cisler ................. G06F 16/4387 707/654 |
| 9,015,248 B2 | 4/2015 | Barreto et al. |
| 9,054,919 B2 | 6/2015 | Kiang et al. |
| 9,235,596 B2 * | 1/2016 | Mason, Jr. .......... G06F 16/1774 |
| 9,239,846 B2 | 1/2016 | Besen et al. |
| 9,244,934 B2 | 1/2016 | Besen et al. |
| 9,268,655 B2 | 2/2016 | Chan et al. |
| 9,396,216 B2 | 7/2016 | Barreto et al. |
| 9,396,245 B2 | 7/2016 | Mackenzie et al. |
| 9,407,664 B1 | 8/2016 | Banerjee |
| 9,495,434 B1 | 11/2016 | Walton et al. |
| 9,507,795 B2 | 11/2016 | Dorman et al. |
| 9,535,924 B2 | 1/2017 | Mackenzie et al. |
| 9,547,559 B2 * | 1/2017 | Whitehead .......... H04L 67/1095 |
| 9,547,658 B2 | 1/2017 | Fan et al. |
| 9,553,758 B2 | 1/2017 | Rexer |
| 9,558,202 B2 | 1/2017 | Lockhart et al. |
| 9,563,517 B1 | 2/2017 | Natanzon et al. |
| 9,575,981 B2 | 2/2017 | Dorman et al. |
| 9,632,874 B2 * | 4/2017 | Pawar ................. G06F 11/1456 |
| 9,633,037 B2 | 5/2017 | Smith et al. |
| 9,639,426 B2 * | 5/2017 | Pawar ....................... G06F 8/60 |
| 9,652,741 B2 | 5/2017 | Goldberg et al. |
| 9,773,051 B2 | 9/2017 | Smith |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0073448 A1 | 4/2003 | Ozeki et al. |
| 2003/0084306 A1 | 5/2003 | Abburi et al. |
| 2003/0093404 A1 | 5/2003 | Bader et al. |
| 2003/0097374 A1 | 5/2003 | Himeno |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267825 A1 | 12/2004 | Novak et al. |
| 2004/0267836 A1 * | 12/2004 | Armangau .......... G06F 11/1435 707/999.203 |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038831 A1 | 2/2005 | Souder et al. |
| 2005/0038997 A1 | 2/2005 | Kojima et al. |
| 2005/0050073 A1 | 3/2005 | Demiroski et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Ellen et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0223047 A1 | 10/2005 | Shah et al. |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174051 A1 | 8/2006 | Lord et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011469 A1 | 1/2007 | Allison et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1 | 6/2007 | Bushnell et al. |
| 2007/0157203 A1 | 7/2007 | Lim |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |

(56) References Cited

U.S. PATENT DOCUMENTS

| | | |
|---|---|---|
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1* | 5/2009 | Moromisato .......... G06Q 10/10 715/758 |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276660 A1 | 11/2009 | Griffith et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Lyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Esteve Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1* | 12/2010 | Prahlad ............... H04L 63/0428 711/E12.001 |
| 2010/0332818 A1 | 12/2010 | Prahlad et al. |

(56) References Cited

U.S. PATENT DOCUMENTS

| | | |
|---|---|---|
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van Der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0099212 A1 | 4/2011 | Hahn et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0282843 A1* | 11/2011 | Wang ............... G06F 11/1466 707/649 |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0030187 A1 | 2/2012 | Marano et al. |
| 2012/0036370 A1 | 2/2012 | Lim et al. |
| 2012/0057696 A1 | 3/2012 | Chew |
| 2012/0064879 A1 | 3/2012 | Panel |
| 2012/0072436 A1 | 3/2012 | Pierre et al. |
| 2012/0079095 A1* | 3/2012 | Evans .................. G06F 16/27 709/224 |
| 2012/0089569 A1* | 4/2012 | Mason, Jr. .......... G06F 16/1873 707/639 |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1* | 5/2012 | Abercrombie ...... G06F 11/1451 711/E12.103 |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1 | 8/2012 | Uner et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1 | 12/2012 | Dellinger et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |

(56) References Cited

U.S. PATENT DOCUMENTS

| | | |
|---|---|---|
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0117226 A1 | 5/2013 | Jain et al. |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 * | 5/2013 | Gupta .............. G06F 11/1471 707/E17.007 |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185452 A1 | 7/2013 | Burckart et al. |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0219176 A1 | 8/2013 | Akella et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282658 A1 | 10/2013 | Besen et al. |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1 | 12/2013 | Akirav et al. |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0149461 A1 | 5/2014 | Wijayaratne et al. |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0215303 A1 | 7/2014 | Grigorovitch et al. |
| 2014/0230011 A1 | 8/2014 | Drewry et al. |
| 2014/0244600 A1 | 8/2014 | Schmidt et al. |
| 2014/0258350 A1 | 9/2014 | Duval et al. |
| 2014/0280605 A1 | 9/2014 | Zhang |
| 2014/0298420 A1 | 10/2014 | Barton et al. |
| 2014/0337291 A1 | 11/2014 | Dorman et al. |
| 2014/0337482 A1 | 11/2014 | Houston et al. |
| 2014/0337491 A1 | 11/2014 | Barreto et al. |
| 2014/0344456 A1 | 11/2014 | Buzbee et al. |
| 2014/0359085 A1 | 12/2014 | Chen |
| 2014/0359286 A1 | 12/2014 | Wen et al. |
| 2014/0372376 A1 | 12/2014 | Smith et al. |
| 2014/0379647 A1 | 12/2014 | Smith et al. |
| 2014/0379760 A1 | 12/2014 | Martin et al. |
| 2015/0019723 A1 | 1/2015 | Kweon et al. |
| 2015/0039556 A1 | 2/2015 | Mackenzie et al. |
| 2015/0154156 A1 | 6/2015 | Meyers, Jr. et al. |
| 2015/0186668 A1 | 7/2015 | Whaley et al. |
| 2015/0215772 A1 | 7/2015 | Gattu et al. |
| 2015/0237406 A1 | 8/2015 | Ochoa et al. |
| 2015/0339113 A1 | 11/2015 | Dorman et al. |
| 2016/0065672 A1 | 3/2016 | Savage et al. |
| 2016/0350326 A1 | 12/2016 | Simonetti |
| 2017/0220596 A1 | 8/2017 | Smith et al. |
| 2018/0004831 A1 | 1/2018 | Smith |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610770 A1 * | 3/2013 |
| EP | 2610776 A2 | 7/2013 |
| EP | 2849134 A1 * | 3/2015 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |

(56) References Cited

FOREIGN PATENT DOCUMENTS

| WO | WO-2012167272 A1 | 12/2012 |
|---|---|---|
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

"Agilewords—How to Request Approval," YouTube, http://www.youtube.com/watch?v=3-Ov3DYNN3Q, Jan. 31, 2011, 2 pages.
"Average Conversion Time for a D60 RAW file?" http://www.dpreview.com, Jul. 22, 2002, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"Dropbox: Sync only specific folders," posted on Feb. 9, 2012, available online at http://www.tech-recipes.com/rx/20865/dropbox-sync-only-specific-folders/, 4 pages.
"How-to Geek, How to Sync Specific Folders With Dropbox," downloaded from the internet http://www.howtogeek.com, Apr. 23, 2013, 5 pages.
"How-to Geek, Howto Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burney, "How to Move Document from Your Computer to Your iPad and Back Again," May 31, 2011, 3 pages.
Burns, "Developing Secure Mobile Applications for Android," Oct. 2008, Version 1.0, 1-28 pages.
Cicnavi, "Offline Files in XP," Nov. 29, 2010, UtilizeWindows, pp. 1-6.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Conner, "Google Apps: The Missing Manual," published by O'Reilly Media, May 27, 2008, 42 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP 13177108.1, Applicant: Box, Inc. dated Feb. 17, 2015, 6 pages.
Exam Report for EP 13185269.1, Applicant: Box, Inc., dated Feb. 13, 2015, 8 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1220644.7, Applicant: Box, Inc., dated May 1, 2015, 4 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1308842.2, Applicant: Box, Inc. dated Mar. 10, 2014, 4 pages.
Exam Report for GB1309209.3 Applicant: Box, Inc. dated Jan. 19, 2015, 6 pages.
Exam Report for GB1309209.3 Applicant: Box, Inc. dated Oct. 7, 2014, 3 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8 Applicant: Box, Inc. dated Nov. 7, 2014, 2 pages.
Exam Report for GB1311417.8, Applicant: Box, Inc. dated Dec. 23, 2013, 5 pages.
Exam Report for GB1311421.0 Applicant: Box, Inc. dated Nov. 7, 2014, 4 pages.
Exam Report for GB1311459.0, Applicant: Box, Inc., dated Aug. 19, 2013, 6 pages.
Exam Report for GB1312095.1 Applicant: Box, Inc. dated Nov. 19, 2014, 5 pages.
Exam Report for GB1312095.1, Applicant: Box, Inc. dated Dec. 12, 2013, 7 pages.
Exam Report for GB1312264.3, Applicant: Box, Inc. dated Jan. 30, 2015, 5 pages.
Exam Report for GB1312264.3, Applicant: Box, Inc. dated Mar. 24, 2014, 7 pages.
Exam Report for GB1312874.9 Applicant: Box, Inc. dated Sep. 26, 2014, 2 pages.
Exam Report for GB1312874.9, Applicant: Box, Inc. dated Dec. 20, 2013, 11 pages.
Exam Report for GB1312874.9, Applicant: Box, Inc. dated Feb. 10, 2015, 7 pages.
Exam Report for GB1313559.5 Applicant: Box, Inc. dated Nov. 4, 2014, 2 pages.
Exam Report for GB1313559.5, Applicant: Box, Inc., dated Aug. 22, 2013, 19 pages.
Exam Report for GB1314771.5, Applicant: Box, Inc. dated Feb. 17, 2014, 7 pages.
Exam Report for GB1315232.7 Applicant: Box, Inc. dated Oct. 9, 2014, 5 pages.
Exam Report for GB1316532.9, Applicant: Box, Inc. dated Oct. 31, 2013, 10 pages.
Exam Report for GB1316532.9, Applicant: Box, Inc., dated Mar. 27, 2015, 6 pages.
Exam Report for GB1316532.9; Applicant: Box, Inc., dated Mar. 8, 2016, 3 pages.
Exam Report for GB1316533.7, Applicant: Box, Inc. dated Oct. 8, 2013, 9 pages.
Exam Report for GB1316682.2 Applicant: Box, Inc. dated Nov. 19, 2014, 6 pages.
Exam Report for GB1316685.5, Applicant: Box, Inc. dated Feb. 17, 2015, 5 pages.

(56) References Cited

OTHER PUBLICATIONS

Exam Report for GB1316971.9, Applicant: Box, Inc. dated Nov. 26, 2013, Wpages.
Exam Report for GB1317393.5 Applicant: Box, Inc. dated Nov. 7, 2014, 6 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1318789.3 Applicant: Box, Inc. dated Oct. 30, 2014, 6 pages.
Exam Report for GB1318792.7, Applicant: Box, Inc. dated May 22, 2014, 2 pages.
Exam Report for GB1320902.8, Applicant: Box, Inc. dated Dec. 20, 2013, 6 pages.
Exam Report for GB1410569.6 Applicant: Box, Inc. dated Jul. 11, 2014, 9 pages.
Exam Report for GB1413461.3; Applicant: Box, Inc., dated Aug. 21, 2015, 6 pages.
Exam Report for GB1415126.0 Applicant: Box, Inc. dated Oct. 2, 2014, 8 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Fu et al., "Efficient and Fine-Grained Sharing of Encrypted Files," Quality of Service (IWQos), 2010 18th International Workshop on year 2010, pp. 1-2.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Ivens, "Configuring Offline Files," Apr. 21, 2002, Windows IT Pro, pp. 1-5.
Ivens, "Using and Troubleshooting Offline Files," Jun. 23, 2002, Windows IT Pro, Figure 1.
Ivens, "Using and Troubleshooting Offline Files," Jun. 23, 2002, Windows IT Pro, pp. 1-5.
John et al., "Always Sync Support Forums—View topic—Allway sync funny behavior," Allway Sync Support Forum at http://sync-center.com, Mar. 28, 2011, XP055109680, 2 pages.
Kretzschmar et al., "Functional Components for a Security Manager within Future Inter-Cloud environments," Copyright 2011 IEEE, 5 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Li et al., "CloudVO: Building a Secure Virtual Organization for Multiple Clouds Collaboration," Copyright 2010 IEEE, 6 pages.
Microsoft Windows XP Professional Product Documentation: How Inheritance Affects File and Folder Permissions, Apr. 11, 2014, 2 pages.
Mont et al., "Risk Assessment and Decision Support for Security Policies and Related Enterprise Operational Processes," Copyright 2011 IEEE, 4 pages.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc To Add HTML5 Document Converter And Sleek Content Viewing Experience To Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP 13189144.2 Applicant: Box, Inc. dated Sep. 1, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Apr. 7, 2014, 6 pages.
Sommerer, "Presentable Document Format: Improved On-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
TaheriMonfared et al., "Monitoring Intrusions and Security Breaches in Highly Distributed Cloud Environments," Copyright 2011 IEEE, 6 pages.
Tulloch et al., "Windows Vista Resource Kit," Apr. 8, 2007, Microsoft Press, XP055113067, 6 pages.
User's Guide for SMART Board Software for Windows, published Dec. 2004, 90 pages.
Vimercati et al., "Managing and Accessing Data in the Cloud: Privacy Risks and Approaches," Copyright 2012 CRiSIS, 9 pages.
Walker, "PDF.js project meeting notes," retrieved from the internet, http://groups.google.com, May 15, 2014, 1 page.

(56) References Cited

OTHER PUBLICATIONS

Wang et al., "Data Leakage Mitigation for Discretionary Access Control in Collaboration Clouds," Copyright 2011 ACM, 10 pages.
Wayback, "Wayback machine," Wayback, Jun. 1, 2011, 1 page.
Wei, et al., "Managing Security of Virtual Machine Images in a Cloud Environment," CCSW'09, Nov. 13, 2009, pp. 91-96.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Zambonini et al., "Automated Measuring of Interaction with User Interfaces," Published as WO2007113573 Oct. 2007, 19 pages.

\* cited by examiner

MAINTAINING AND UPDATING FILE SYSTEM SHADOWS ON A LOCAL DEVICE BY A SYNCHRONIZATION CLIENT OF A CLOUD-BASED PLATFORM

CROSS-REFERENCE TO RELATED APPLICATION(S)

This application is a continuation of U.S. patent application Ser. No. 14/312,482 filed Jun. 23, 2014, entitled "MAINTAINING AND UPDATING FILE SYSTEM SHADOWS ON A LOCAL DEVICE BY A SYNCHRONIZATION CLIENT OF A CLOUD-BASED PLATFORM," which claims the benefit of U.S. Provisional Patent Application No. 61/838,176 filed Jun. 21, 2013, entitled "MAINTAINING AND UPDATING FILE SYSTEM SHADOWS ON A LOCAL DEVICE BY A SYNCHRONIZATION CLIENT OF A CLOUD-BASED PLATFORM," which are incorporated by reference in their entireties.

BACKGROUND

A cloud-based storage or file sharing service allows multiple users to upload, access, view, download or edit content anytime, from any device simultaneously. A synchronization client provided by the cloud-based storage or file sharing service mirrors content stored on a cloud-based storage to a local device. Via the synchronization client, a user can navigate and modify content stored on his or her cloud-based storage service account through his or her device's native file browsing system without using a web browser. Via the synchronization client, content from the user's cloud-based storage service account can be synced down to the user' device (e.g., for offline access). When changes are made to the local synced content, the synchronization client can automatically relay those changes back to the user's cloud-based storage service account so that the changes are not lost but persist in the user's cloud-based storage service account.

BRIEF SUMMARY

Embodiments of the present disclosure are directed to maintaining and updating file system shadows on a local device by a synchronization client of a cloud-based platform. According to one embodiment, a method can comprise, in response to detecting a change to a file or a folder in a local file system of a mobile device, generating file system notifications about the change. The change to the file or the folder can be indicated as a change of a state of the file or the folder from an old state to a new state. A partial scan of the local file system can be performed to identify other changes to files or folders in the local file system. A consistent snapshot representing a current state of the local file system and a reference snapshot representing a last known state of the local file system can be generated. A difference between the consistent snapshot and the reference snapshot can be determined and in response to the determined difference, the reference snapshot can be updated by merging the consistent snapshot on top of the reference snapshot.

BRIEF DESCRIPTION OF THE DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
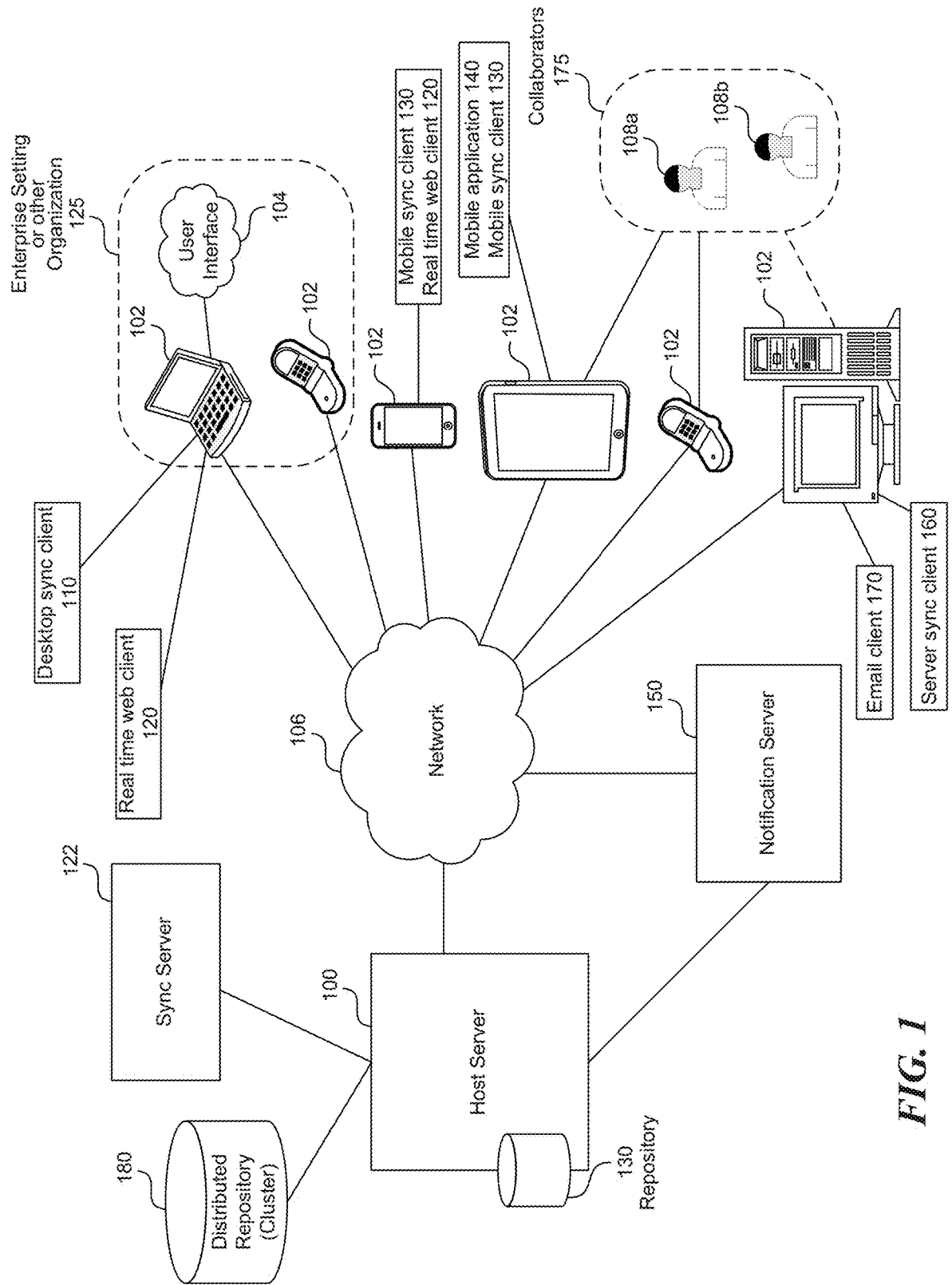
FIG. 1 illustrates an example diagram of a cloud-based service, collaboration and/or cloud storage platform that provides a synchronization client that maintains and updates file system shadows for detecting changes that would otherwise go undetected.

Techniques for maintaining and updating shadows of a local file system by a synchronization client are disclosed. Some embodiments disclosed herein provide systems and methods for maintaining and updating shadows of the local file system in a synchronization client that can communicate with a synchronization server and/or a host server of a cloud-based collaboration and storage service or platform. In some embodiments, a method for maintaining and updating shadows of a local file system by a synchronization client includes executing an action on an item in the local file system by the synchronization client. The action changes the state of the item from an old state to a new state. The method also includes providing an interface for updating the one or more shadows of the local file system and updating the one or more shadows of the local file system with the new state of the item using the interface to facilitate generation of a synchronization event for the change to the item. In some embodiments, immediately following execution of the action, the method includes executing another action on the item by the synchronization client. The another action reverses the change to the item so that a current state of the local file system retains the old state of the item. The method then includes determining a difference between the current state of the local file system and a state of the one or more shadows. The states of the one or more shadows have the new state of the item. The method then includes generating the synchronization event for the change to the item that is immediately reversed based on the difference to bring a remote file system in synchronization with the local file system. In some embodiments, without updating the one or more shadows of the local file system with the new state of the item, the change to the item that is immediately reversed can go undetected and cause the remote file system and the local file system to go out of synchronization.

In some embodiments, the method can include enhancing concurrency in the local file system by scanning the local file system to determine the current state of the file system. The scanning can be in response to a local file system notification. The method then includes acquiring a monitor lock to prevent concurrent access to the one or more shadows and verifying that the one or more shadows have not been updated in between completion of the scan of the local file system and acquiring the monitor lock before determining the difference between the current state of the local file system and the state of the one or more shadows.

In some embodiments, a synchronization client for updating one or more shadows of a local file system includes a local file system monitor comprising one or more shadows of the local file system and a synchronization executor. The local file system monitor can scan the local file system to determine the current state of the local file system, determine any difference between the current state and the last known state of the local file system provided by the one or more shadows of the local file system and identify, based on the difference, items for which synchronization events are to be generated, wherein the synchronization events synchronize the local file system with a remote file system. The synchronization executor can execute an action on an item in the local file system that changes the state of the item from an old state to a new state and provide the new state of the item via an interface to the local file system monitor to update the one or more shadows of the local file system.

Among other benefits, the disclosed techniques for updating the shadows of the local file system as soon as items with new states have been created by a synchronization executor allows the synchronization client to detect changes, including those that can be undone by other operations on the monitored filesystem before, they can be detected by a scan. For example, a newly created item can be immediately deleted or a newly renamed item can be immediately renamed back to its original name. If the reference snapshot (or the shadows) is not aware of the change made by the sync executors, it will not know to generate an item change for these items since nothing has changed about the item since the last scan. As a result, the file system will fall out of synchronization. Another benefit of pushing the most up to date information about the monitored filesystem into the scanners of the file system monitor is that it provides a completely state based means of handling echoback events. Because the scanner already has the information about the changes made to the monitored filesystem by the sync executors, it will not pick up those changes during its next partial scan.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a cloud-based service, collaboration and/or cloud storage platform that provides a synchronization client that maintains and updates file system shadows for detecting changes that would otherwise go undetected. As shown in FIG. 1, a host server 100 of a cloud-based service, collaboration and/or cloud storage platform can send changes or updates to remote synchronization clients (or sync clients) (e.g., clients 110, 120, 130, 140, 160, 170) at devices 102 with events that occurred via the platform hosted by the server 100. Similarly, sync clients at devices 102 can send sync events to the cloud-based service, collaboration and/or cloud storage platform for execution on the remote file system maintained server side.

The client devices 102 can be any system and/or device, and/or any combination of devices/systems that is able to establish a communication or a connection, including wired, wireless, cellular connections with another device, a server and/or other systems such as host server 100 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, *Nexus* 4, etc.), a Treo, a handheld tablet (e.g. an iPad, iPad Mini, a Galaxy Note, Galaxy Note II, Xoom Tablet, Microsoft Surface, Blackberry PlayBook, *Nexus* 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators iii a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
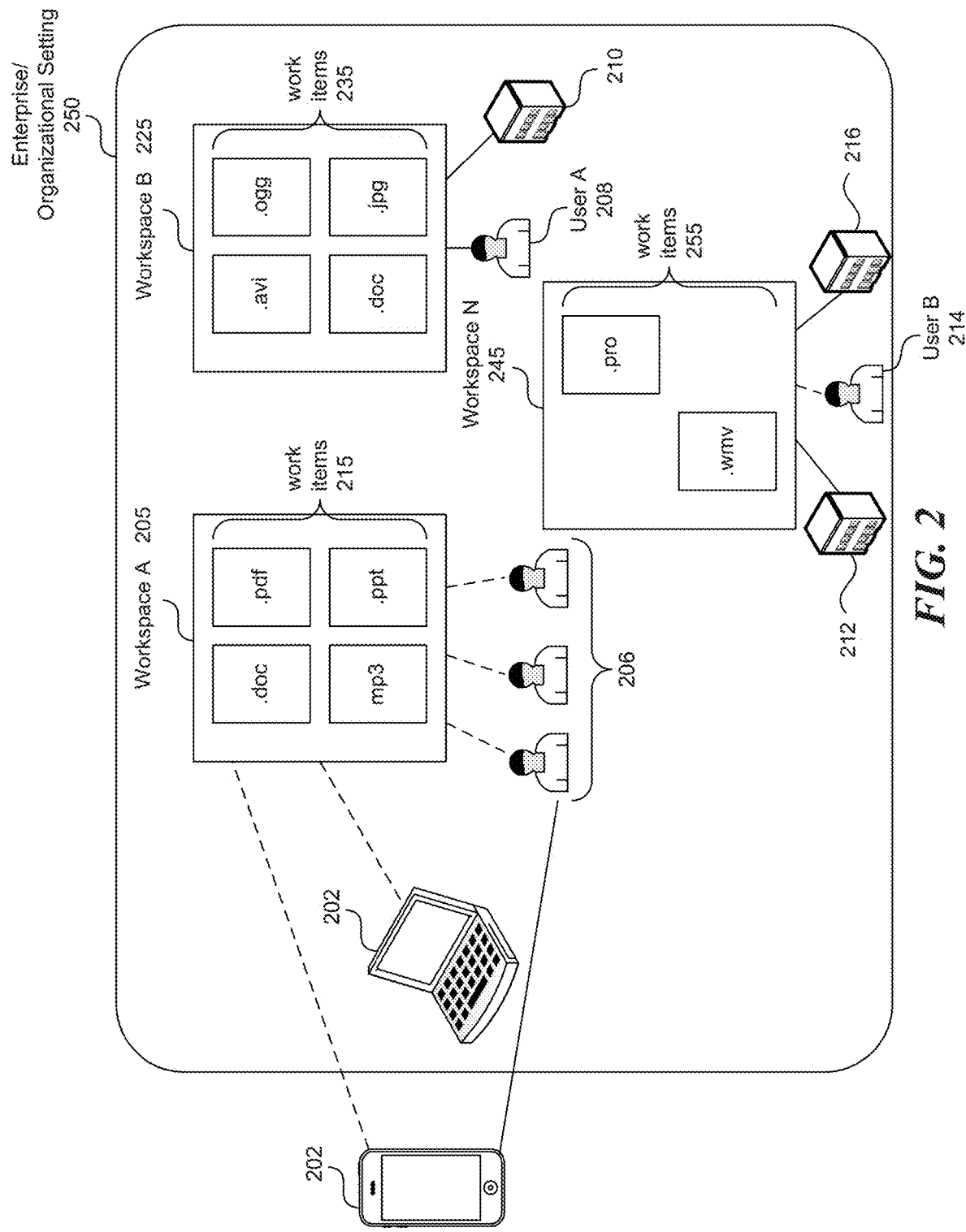
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

In general, when a user action takes place, the user action is processed to become a plurality of event entries each corresponding to a collaborator 175, and each event entry can be read by a remote client of the collaborator to reflect the user action.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 215 for other associated users and/or users associated with: the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
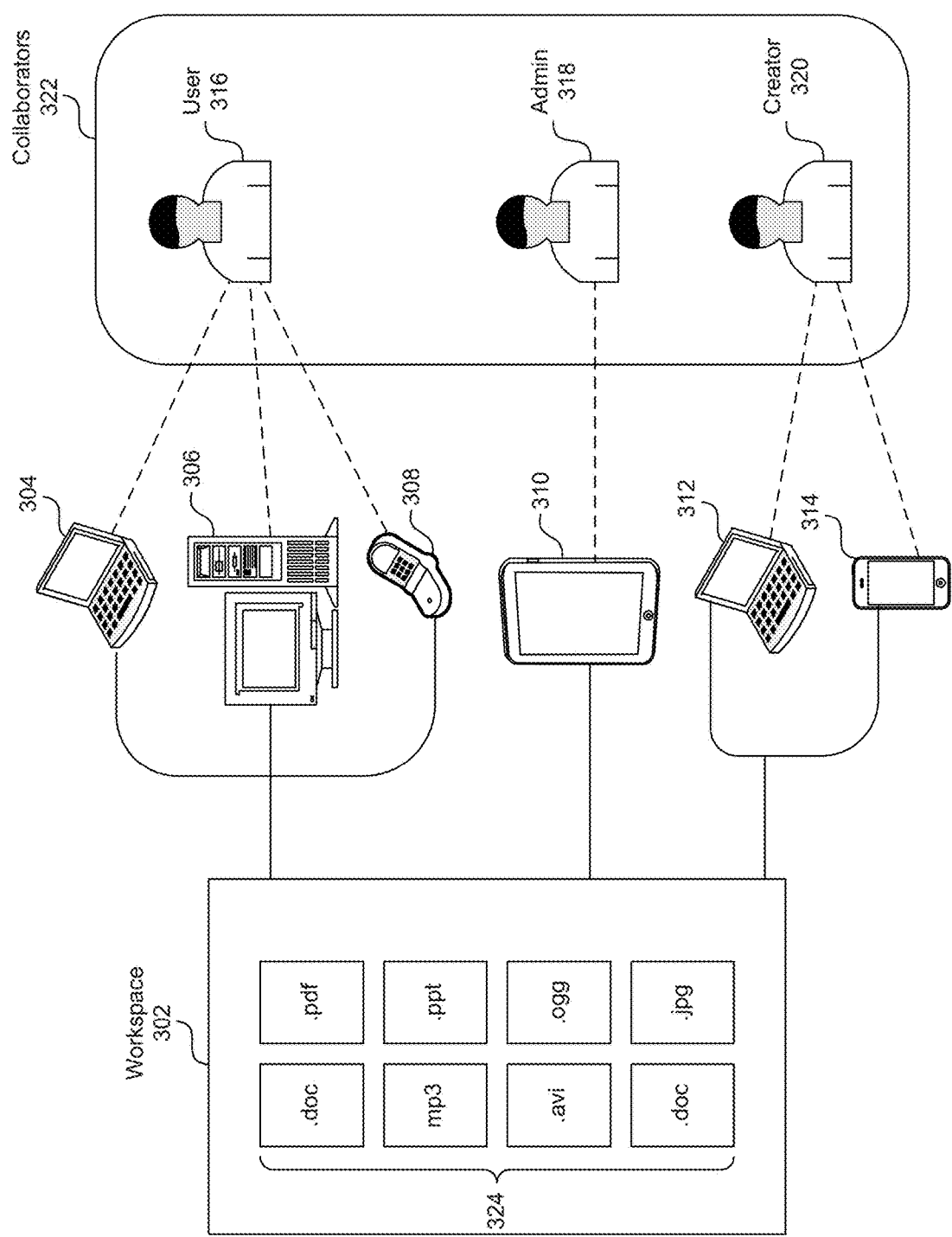
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable: events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
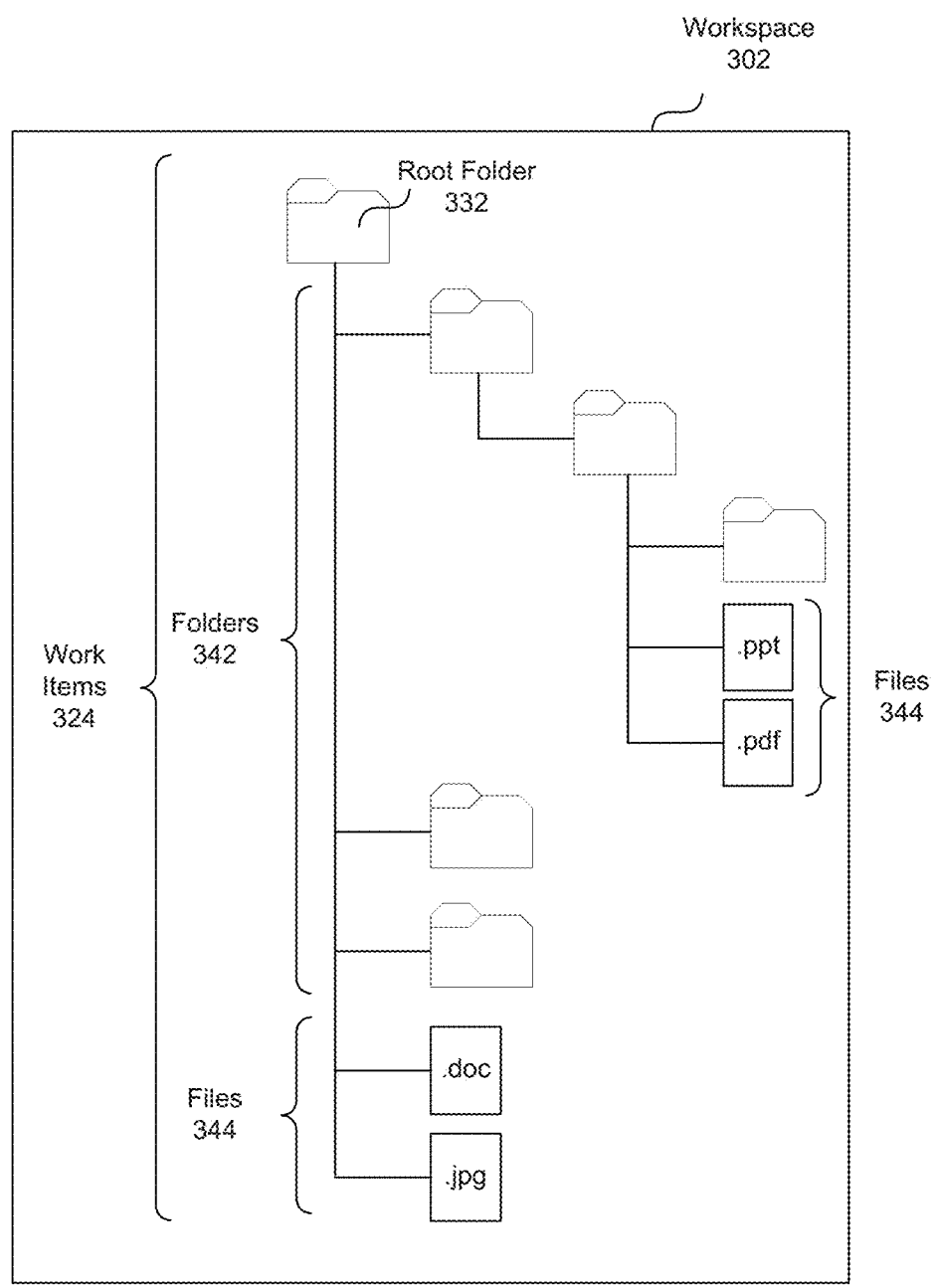
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there, can be more than one level of hierarchy between the illustrated folders.

Further, in some of the present embodiments, the synchronization state of a folder can be: (i) synchronized, (ii) partially synchronized, or (iii) unsynchronized. For purposes of discussion herein, a folder is synchronized when all items (e.g., folders and files) under the folder are synchronized. Likewise, a folder is unsynchronized when all items (e.g., folders and files) under the folder are unsynchronized. A folder is partially synchronized when it is neither synchronized nor unsynchronized.

Figure 4:
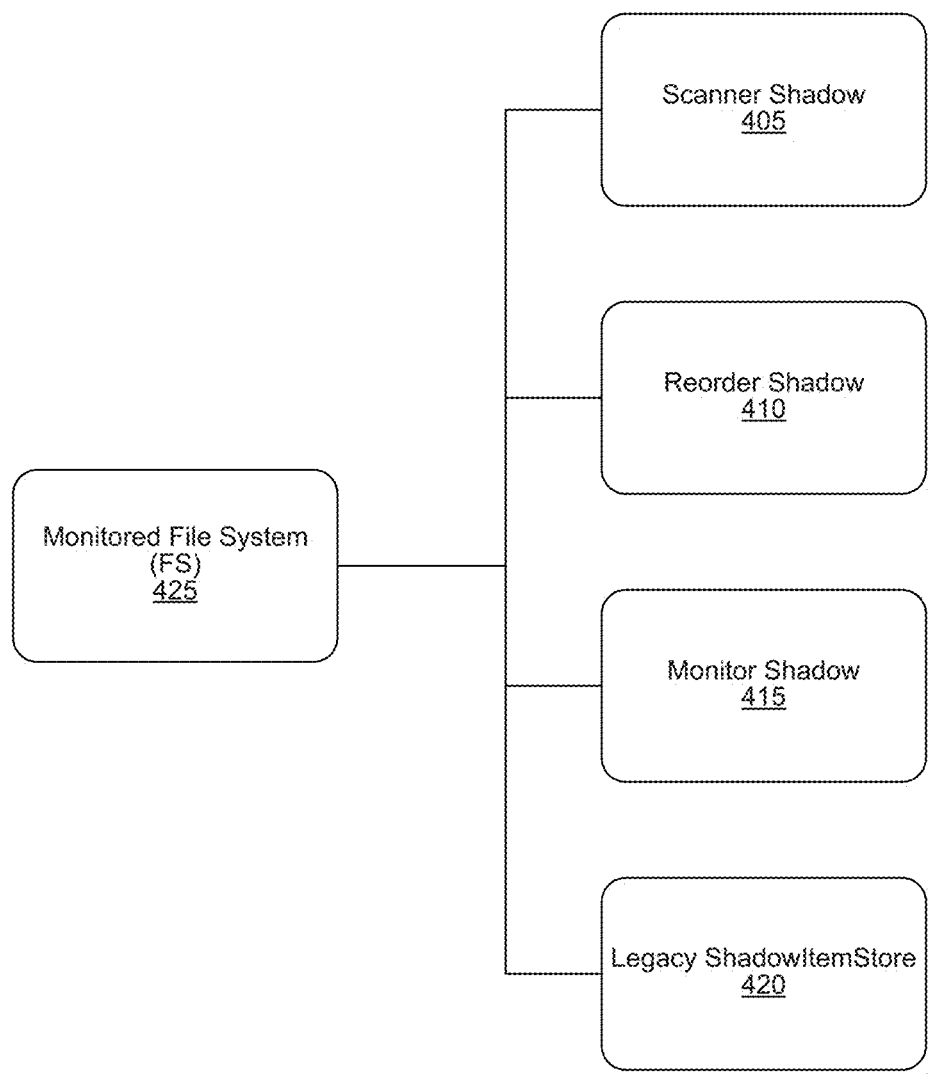
FIG. 4 depicts an example block diagram showing four example shadows of a monitored file system of a synchronization client of a cloud-based platform.

Referring to FIG. 4, the illustrated example block diagram shows four example shadows of a monitored file system of a synchronization client of a cloud-based platform. The synchronization client can maintain four separate file system shadows of each monitored filesystem 425, referred to as: the scanner shadow 405, the reorder shadow 410, the monitor shadow 415, and the legacy ShadowItemStore 420, which may be used for path look-ups by the IconManager.

In some embodiments, these shadows, collectively, allow the synchronization client to detect changes in the monitored filesystem by providing the synchronization client with a last known state to compare against for determining any difference (i.e., providing the synchronization client with a last known state to diff against). In some embodiments, these shadows can allow the synchronization client to properly order changes detected on a given filesystem by comparing each change against the last known state of the filesystem to see if applying the change to the filesystem pushes the file system into an inconsistent state. If it does, the change is buffered until other changes have made the change in question consistent with the shadow. These shadows can also allow the synchronization client to do path look ups for items. This can be necessary on the local filesystem since all local filesystem APIs are path-based and so the synchronization client can translate between an identifier (id) and path in order to perform any operations on the local filesystem.

In some embodiments, the shadows can be updated from within the Filesystem (FS)i monitor as changes flow through the FS monitor's filter pipeline. This could have the advantage in isolating updates of the shadows to one single-threaded component and allowing the shadows at the end of the pipeline (after the changes have been properly ordered) to make strong claims about their internal consistency.

However, this can also have the downside that the shadows do not reflect the full knowledge the synchronization client has about the monitored filesystem, as changes made by the synchronization client directly on the filesystem would not be propagated to the shadows until they are detected by the FS monitor. This can impact the shadows' ability to meet their primary obligations, particularly their ability to perform accurate path lookups. In some instances, after a synchronization executor has altered a path on the local filesystem, e.g. by renaming a folder, the shadow can continue to report the old path until it detects the echoback event renaming the folder, causing all synchronization events executed within that path to fail in the interim. In some instances, this problem can be common enough to alter the executors' interaction with the monitor shadow, where they perform their path look ups, so that the executors pushed their changes directly into the monitor once completed, allowing the path look ups to take into account the full knowledge the synchronization client has available about the filesystem and thus become much more robust.

Although in some instances propagating the updated item state from the executors to the monitor shadow solves the path look up problems, the other shadows can still suffer from having incomplete knowledge of the filesystem. For example, the scanner shadow in particular may have difficulty detecting changes on the filesystem in rare cases if it does not have knowledge of the changes made by the synchronization executors. If an event executed by the synchronization client is immediately undone on the monitored filesystem (for example if after a rename by the synchronization client an item is immediately restored to its original name) the synchronization client will not be able to detect that change. At the front of the monitoring pipeline, embodiments of the current system diff (i.e., determine difference between) the current state of the filesystem against the scanner shadow to determine what items to generate synchronization events for. If the monitor does not know that an item's state has been updated by the executors, it may not be able to tell that the item has changed when it returns to its previous state and will not be able to generate a synchronization event that can bring the opposite filesystem back in sync. Although in some instances much rarer than the path look up problem, this issue can also be much more serious, since while for a failed path look up the action will be retried by the failure recovery manger and eventually succeed, in this case the two items can remain out of synchronization until the synchronization client is re-started.)

These problems can be overcome by the disclosed embodiments that fully propagate the information the executors have about the new state of the filesystem to all shadows in the filesystem to monitor as soon as the executor completes the action. Doing this can also have an additional advantage, in that it will provide the system with a natural method of performing echoback detection at the very beginning of the filter pipeline. Because the file system scanners detect changes in the monitored filesystem by diffing against their local shadow, in some embodiments, if the shadow is updated with the new state of an item as soon as the executor modifies it, the scanner may not detect a change in the item and thus never generate an echoback event. This can be beneficial as some instances of the current method of detecting echobacks at the end of the pipeline by matching the events against a discard list populated by the executors can be brittle in the face of filters that re-write the events they process, which both the re-orderer and atomic save filters may do. In some embodiments, any re-writing that occurs on echoback events can cause them to fail to be detected by a current echoback filter, leading to undesired actions being taken on the opposite FS or even crashes when the state of the synchronization core is no longer consistent with the event being produced.

Figure 5:
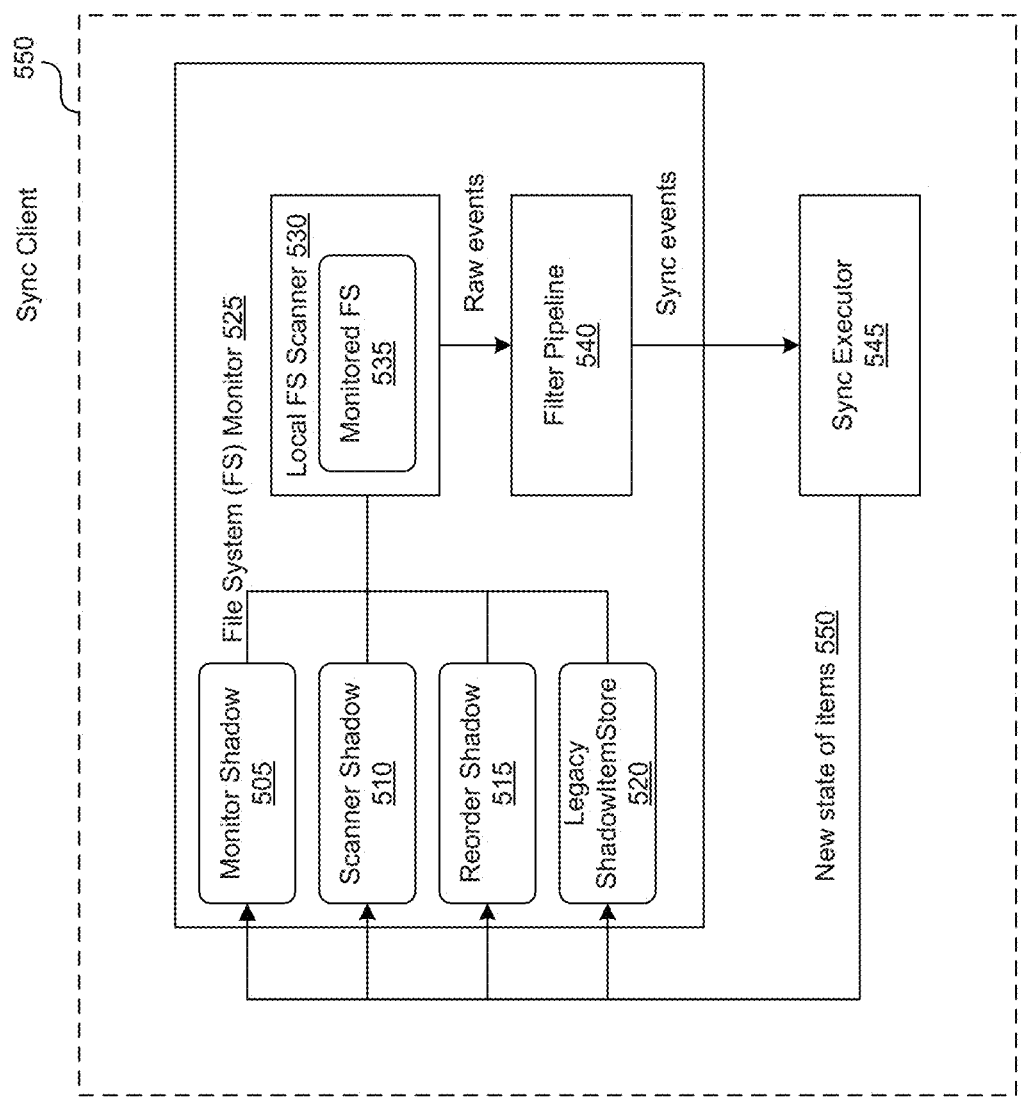
FIG. 5 depicts an example block diagram showing the propagation of new updates to items from a sync executor to the shadows of the monitored file system of the synchronization client of a cloud-based collaboration platform.

FIG. 5 depicts an example block diagram showing the propagation of new updates to items from a sync executor to the shadows of the monitored file system of the synchronization client of a cloud-based collaboration platform. As illustrated, sync executors 545 execute sync events from a sync queue. Sync events can include actions or operations such as rename, delete, move, edit, etc., on items such as files or folders. When the sync executor performs an action on an item on a local file system, the state of the item is updated from an old state to a new state. The new state of items 550 are then pushed to the file system monitor 525 to update the shadows 505, 510, 515 and 520. The local file system scanner 430 scans the local file system 535 to determine the current state of the file system 535 and utilizes the last known state of the shadows to determine changes. The changes or "raw events" are then ordered and/or filtered by the filter pipeline 540 to generate synchronization events or "sync events" which are then passed on to the sync executor 545. These components are described in detail with respect to FIGS. 6A and 6B.

Example Embodiments

Some embodiments allow the monitor to detect when actions taken by the synchronization client on the monitored filesystem have been undone. Some embodiments allow echoback detection to be performed without any echoback events to be generated or to pass through any stages of the filter pipeline. Some embodiments do not introduce any regressions in the synchronization executors' current ability to look up accurate local paths via the monitor shadow Some embodiments enable propagation of updated item information from the executors throughout the monitor may or may not stick with the executors' current interactions with the monitor shadow. The monitor shadow can move up to a top level monitor construct that internally wraps the scanner shadow and directs all path queries there, as the scanner shadow will contain the most up-to-date information about the filesystem out of all the shadows in the monitor. On the updates from the executors, in addition to pushing the new state of the item into the scanner shadow, in some embodiments, the monitor can also call an update item method on the filter pipeline that can in turn pass the updated item information to each stage in the filter pipeline, allowing each stage to update any internal file system shadows or other buffered file system information with the new state of the affected item.

Concurrency Considerations

In some embodiments, providing an interface for the executors to update the FS monitor and all its shadows makes the FS monitor multi-threaded. In some embodiments, the data structures can now require locking protection in order to make them thread safe. In some embodiments, this can be accomplished with a single monitor lock, which can prevent the executors and the monitor thread from executing simultaneously. The existing locking used by the executors to protect against concurrent access with the monitor shadow could be sufficient for this purpose, although some embodiments further tune that locking so that it covers a smaller period of time, as currently one of the executor threads to run at a time.

To enhance concurrency, the local scanner need not hold the monitor lock while it is scanning the filesystem or waiting for a quiet period to occur, but instead only acquire the monitor lock once it is ready to start diffing against its reference snapshot, which is the Shadow for which access is shared across threads with the executors. This can greatly reduce contention in some embodiments, especially in the case where a large number of changes are being synced from the cloud-based platform server to the local device and the local scanner continuously needs to do full scans. In some embodiments, in order for this to work, the scanner may need to be able to verify that no executor updated the scanner's shadow in between the scanner completing its scan and acquiring the lock to start the diff. In order for the scanner to work properly, the scanner needs to know that the information it has picked up in its scan is entirely more recent than the information in the shadow it is diffing against. Otherwise, in some embodiments it will initiate changes that will drive the synchronization client backwards in time.

This can be accomplished in one of two ways. In some embodiments, the monitor can set a flag indicating that the scanner shadow has been updated by the executors, which the scanner can check before initiating the diff. If the scanner finds that the flag is set, it can know that the shadow potentially contains more recent information than its scan and it can clear the flag, release the monitor lock, and re-initiate a new scan. Another method that will potentially allow for less need for duplicate scans is for the FS monitor to keep track of which items have been updated by the executors since the last scanner diff. The scanner could then diff those items against the state it has for them in the new scan and only start the scan if any of the items differ. This strategy can be particularly useful in embodiments which switch over to partial scanning as the system will then only need to re-scan the updated items that differed between the scan and the shadow, instead of the whole tree.

On the server side (e.g., cloud-based system side), although a similar approach can work, it may introduce more cases where the system would have to fall back to scans from the action log framework (ALF) stream. In some embodiments, the cloud-based system (e.g., a cloud-based collaboration and/or storage service or platform) can make use of a sequence identifier (seq_id) to determine, when performing a diff, which side has the more up-to-date information. One complication here is that when the executors perform an action on the cloud-based system the executors will receive the new high-water seq_id for the item as a whole, but that seq_id may represent changes in addition to those performed by the executor that have not yet been synced down. To resolve this issue, in some embodiments, the scanner can keep track of the highest seq_id seen for each set of fields affected by a different event type and only take into account changes in fields where the seq_id for that field set is also higher on the scanned item than in the shadow.

Shadow Consistency

In some embodiments, the synchronization client uses two types of FSShadows, the base class, which includes just a collection of item states with additional functionality or constraints on the contents of the shadow, and a ConsistentFSShadow, which includes a shadow that represented a consistent tree structure and thus performed checks before accepting any update that the new state was consistent with the rest of the shadow and also supported tree-like queries, such as finding the path to an item.

The ConsistentFSShadow can be used in the re-orderer as the gate to prevent out-of-order events from traveling further in the filter pipeline. Because it also supports all tree-like queries in some embodiments, it can be used in the monitor shadow to support path look-ups. Because of the monitor shadow's position after the re-orderer in the filter pipeline in some embodiments, this can be a safe route to take so long as the monitor shadow is only updated by the events passing through the filter pipeline as the re-orderer would guarantee that the events always arrive at the monitor shadow in such a way as to never push the shadow into an inconsistent state. Once the monitor shadow is updated by the executors, these embodiments may lose this protection, as an event could be consistent with the underlying filesystem and succeed when applied but be inconsistent with the monitor shadow due to the lag time between the underlying filesystem changing and the resulting event reaching the monitor shadow and updating its state.

Under these circumstances, an update may still be applied, since it actually represents the known most current state of the filesystem and can be needed for the monitor shadow to provide accurate path look ups. In some embodiments, the problem may be exacerbated once the executors are allowed to propagate their state throughout the shadows.

One example solution allows tree queries to be run against inconsistent shadows and: only use ConsistentFSShadow's ability to reject inconsistent changes inside the reorderer, where it may be explicitly needed. In one embodiment, when a path query is made against an inconsistent shadow, the shadow can detect whether or not it is able to retrieve a valid path by checking that all the parents along the path to the root exist in the shadow and that the path does not form a loop. If either of these conditions is encountered, the shadow can throw an exception and then leave error handling up to the client. The examples to perform path look-ups on consistent shadows where this error handling can be added are in the executors, where the system is looking up the path so that it can perform an operation on the underlying filesystem, and in the native state differ, where the system looks up the path so that it can determine the syncability status an item inherits from its ancestors in some embodiments. In some embodiments of the executors, adding in this error handling may be trivial as the executor already needs to handle cases where the path returned from the shadow is due to being out of sync with the filesystem.

The handling in the native state differ can be slightly more complicated in some embodiments, since adding in buffering and retries in the middle of diffing two native states may not be ideal. Fortunately, the shadow that the native state differ uses can be the same as that used by the reorderer and any changes processed by the native state differ must have valid paths in that shadow, otherwise they would not be released by the reorderer in some cases. This relationship can be further illustrated for example, by having the reorderer perform the syncability state calculations and have the native state differ output the correct events based on the changes in syncability reported by the reorderer.

Figure 6A:
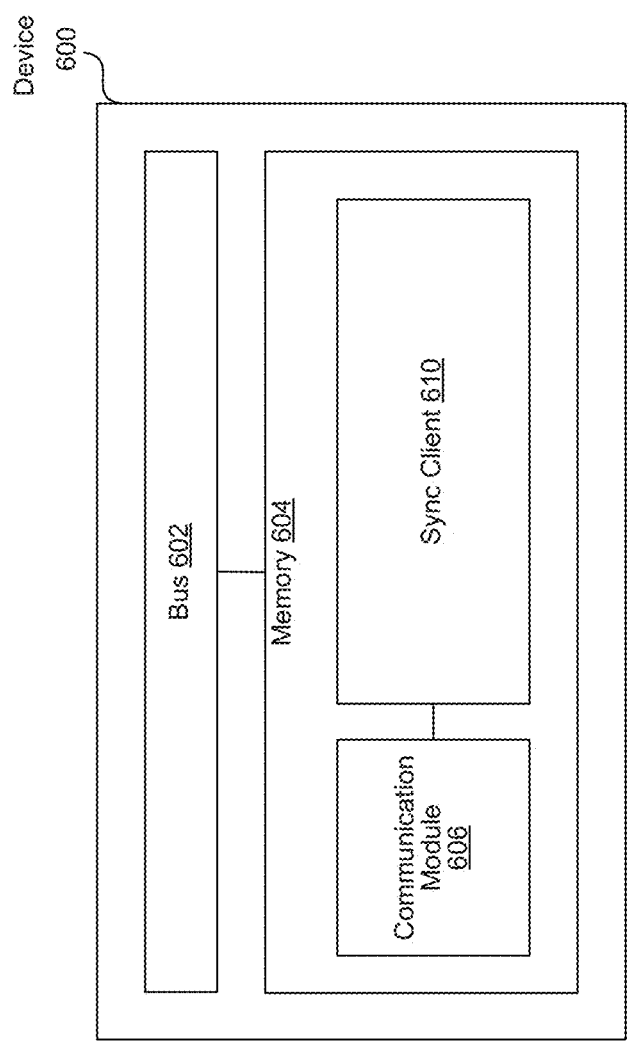
FIG. 6A depicts a block diagram illustrating example components of a device having the synchronization client of a cloud-based collaboration platform that pushes updated item state information to the file system shadows as they become available.
Figure 6B:
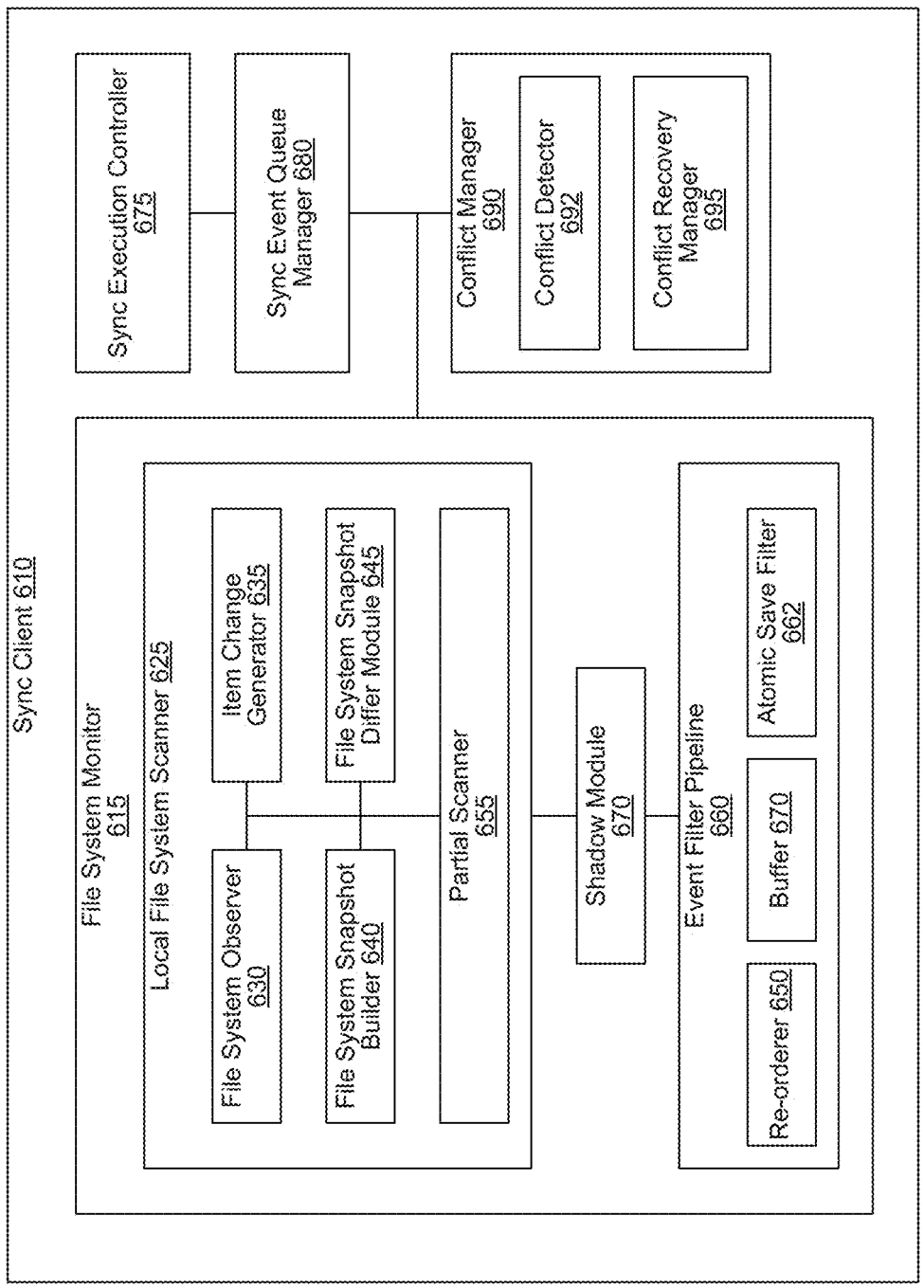
FIG. 6B depicts a block diagram illustrating example components of the synchronization client of FIG. 6A.

FIG. 6A depicts a block diagram illustrating example components of a device having the synchronization client of a cloud-based collaboration platform that pushes updated item state information to the file system shadows as they become available and FIG. 6B depicts a block diagram illustrating example components of the synchronization client of FIG. 6A.

The device 600 can include, for example, a bus 602, and a memory 604 among other components. The memory 604 can include, among others, a sync client 610 and a communication module 606. The communication module 606 facilitates communication among the device 600, the host server 100 using any of the communication protocols that are supported. The memory 604 may also include other device modules (not shown in FIG. 6A for simplicity) such as a GPS module for determining and providing location information, text input module for accepting and processing inputs provided using different input mechanisms of the mobile device, and the like for handling various functions of the device 600. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the device 600 and each illustrated component.

As used herein, a "module," "a manager," an "interface," "observer," "builder," "scanner," "pipeline," "filter," "detector," "generator," "re-orderer," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, observer, builder, scanner, pipeline, filter, detector, generator, re-orderer or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The bus 602 is a subsystem for transferring data between the components of the mobile device 600. For example, the bus 602 facilitates the transfer of data between the memory 604 and other components of the device 600 such as the processor and/or the input/output components that utilize the data.

Example components of the sync client 610 are illustrated in the block diagram of FIG. 6B. In some embodiments, the sync client 610 can include a file system monitor 620 (or raw event processor) having a local file system scanner 625 including a partial scanner 655, a file system observer 630, an item change generator 635, a file system snapshot builder 640 and a file system snapshot differ module 645, among others. The local event monitor 620 can also include an event filter pipeline 660 having a re-orderer 650, an atomic save filter 662 and an item change buffer 670. The sync client can also include a sync execution controller (or sync executor) 675, a sync event queue manager 680 and a conflict manager 690 having a conflict detector 692 and a conflict recovery manager 695. Other embodiments may include more or less components.

In some embodiments, during normal operations, the sync client 780 can operate in a single mode. The file system observers 630 can generate file system notifications when a file or folder changes on the local file system. The file system notifications can include information about the changed file or folder (i.e., dirty file or folder). Generally, the file system observer 630 provides notifications about dirty folders. The local event monitor 625 then triggers the partial scanner 655 to perform a partial scan of the local file system to obtain the full set of dirty items.

In some embodiments, the partial scanner 655 performs partial scanning of the affected or dirty folder by leverage the item change generator 635. The item change generator 635 generates a consistent snapshot (e.g., via the file system snapshot builder 640) and compares the consistent snapshot with a reference snapshot to generate differences between the two snapshots (e.g., file system snapshot differ 645). In some embodiments, the consistent snapshot represents the current state of the file system, while the reference snapshot represents the last known state of the file system shadows. The partial scanner 655 then updates the reference snapshot by applying the new (consistent) snapshot on top. In some embodiments, a snapshot can be built or generated by walking or traversing the directory (or dirty folder tree) and recording all entries. If there are no dirty folders added to the queue for a settle time (e.g., 100 ms), the snapshot is called consistent: If there is a new file system notification, a snapshot is built for that notification, and a new snapshot is built by merging the snapshot for the dirty folder on top of the original snapshot. In some embodiments, the differences between a reference snapshot and the current snapshot are obtained by the file system snapshot differ 645. The reference snapshot can pertain to the last known state of the dirty folder. It should be noted that for the first run, the reference snapshot is built from the persisted LSIS. Via the partial scanning process, the differences between the reference and current snapshots can be determined by generating a list of all item ids that are in the reference snapshot and in the domain of the current snapshot. The process loops through all elements in the current snapshot and obtains item changes for everything that has a different item state in the reference snapshot. All the observed items are then removed from the all item id list. The process then yields item changes with delete set to true for all items remaining in the all item id list. The process then updates the reference snapshot by applying the new snapshot on top of it.

In some embodiments, the re-orderer 650 can detect inter-item event dependencies and re-order the changes as necessary before feeding the item changes to the filter pipeline 660. The re-orderer 650 can reorder items by checking each change against a snapshot of the monitored filesystem to see if the new state brought about by the change is consistent with the rest of the filesystem. If it is, the change is passed on to the event filter pipeline 660 and the snapshot is updated to reflect the change. Otherwise, the change is buffered (e.g., in the item change buffer 670) until another item change alters the snapshot in such a way as to make the buffered change consistent. If an item change remains buffered for longer than a filesystem specific timeout, which can be configurable in some embodiments, then it is assumed that either a change has been missed by the filesystem scanner or the filesystem scanner has returned corrupt changes. In such instances, a notification can be generated for error handling, the change can be dropped, or other process can be initiated to resolve the inconsistency. In one example embodiment, the re-orderer 650 can perform a number of checks to determine if the change is consistent with the existing snapshot.

For example, if the change is for a deleted folder, the re-orderer 650 can check the snapshot to see that the folder does not contain any children. If the change is for a non-deleted item, the re-orderer 650 can check the snapshot to see that the parent folder of the item exists and that no other item with the same name exists in the parent folder. If the change represents a move, the re-orderer 650 can check the snapshot to see that the item is not an ancestor of its new parent. In some embodiments, the re-orderer 650 can also detect and handle circular renames by manufacturing an item change for one of the items that moves the item to a temporary location.

Raw events are produced by the local file system scanner by ordering the item changes and producing a set of executable actions like create, delete, etc. The raw events are processed by the event filter pipeline 660 into sync events that can be executed directly on the opposite file system (i.e., the cloud-based platform file system). In some embodiments, processing the raw events into sync events include translating the file system identifiers of items to logical identifiers so that the events can be executed directly on the opposite file system. An atomic save filter 662 can maintain the mapping between the logical identifiers and the underlying file system identifiers. The mapping and translation of file system identifiers into logical identifiers is needed as the raw events refer to the file system identifier, rather than the logical identifier and on the local file system, the file system identifier of an item can change while the item remains logically the same. The sync events describe executable actions like create, delete, etc., and the sync client is committed to at least attempting to execute the sync events as the sync events are produced in an order that can be consistently applied to the opposite file system.

Some embodiments of the sync client 610 include a sync event queue manager 680 that places sync events on a sync event queue for serialized execution. The sync execution controller (or executor) 675 gets the next event to execute from the sync event queue. The execution controller 675 can have a list based or priority based implementation. For example, in the list based implementation, the next event candidate is checked against the items that are in progress and if the item already has an in progress sync event, the next event candidate is skipped. In the priority based implementation, unprocessed events are managed in a priority queue of sync event containers. A sync event container is a set of all unprocessed sync events for a given item, weighted by the lowest weight sync event in the container. When one sync event from this sync event container is executed, then all sync events for that item are no longer in the priority queue and so the remaining sync events in the sync event container will not be executed on subsequent get_next_sync_event( ) calls. When the in-process sync event is completed, it is removed from the sync event container which is returned back into the priority queue if not empty.

Some embodiments of the sync client 610 include a conflict manager 690. The conflict manager, via the conflict detector 692, can identify when a sync has failed or when a conflict has occurred (e.g., a file or work item/folder has been changed at both the server sync folder and the local sync folder) which caused the sync to fail. A sync event can fail for various reasons which may be conflict related or unrelated. Example failure reasons that are related to conflict include, but are not limited to: item not found, item name in use, item name not valid, item name too long, item locked, version mismatch, or the like. Other failure reasons can include, for example, communication failure (e.g., network goes down), authentication failure (e.g., auth token expired), quota failure, or the like. Some of these sync failures are local to a particular sync event (e.g., item not found is local to a sync event relating to the item) while others are global (e.g., communication failure can impact all sync events). The conflict detector 692 can in general detect sync failures that are conflict related or unrelated.

The conflict manager 690 includes a conflict recovery manager 695 to determine how to resolve the conflict, resolve the conflict using the determined strategy and try to sync again when one or more retry conditions are met. The conflict recovery manager 695 can include several conflict resolvers to resolve various conflict cases. The conflict recovery manager 695 selects a conflict resolver that is mapped to the event type, file system and/or failure reason triple to resolve a conflict related to a sync event. A conflict resolver resolves the conflict by calling a rules engine to determine what action to take to resolve the conflict. When the specified action or actions is taken, the file system is restored back to its consistent state.

In some embodiments, the shadow module 670 maintains and updates shadows of the local file system. The file system monitor 615 (e.g., via the local file system scanner 625) scans the local file system to determine the current state of the local file system and determines any difference between the current state and the last known state of the local file system provided by the shadows of the local file system. The file system monitor 615 (e.g., via the local file system scanner 625) identifies, based on the difference, items for which synchronization events are to be generated to synchronize the local file system with a remote file system. The synchronization executor (e.g., via the sync execution controller 675) executes an action on an item in the local file system that changes the state of the item from an old state to a new state and provides the new state of the item via an interface to the file system monitor 615 (e.g., via the shadow module 670) to update the one or more shadows of the local file system. The shadow module 670 then updates the shadows of the file system using the new state of the item.

Figure 7:
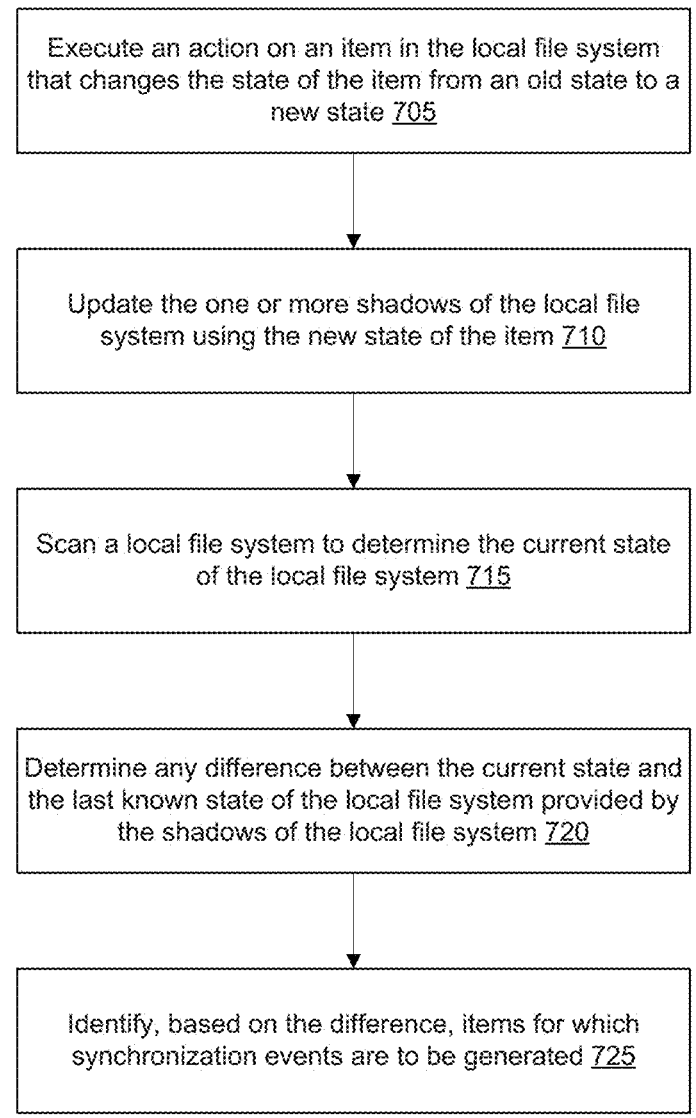
FIG. 7 depicts a logic flow diagram illustrating an example method of updating the shadows of the local file system by the synchronization client of a cloud-based collaboration platform.

FIG. 7 depicts a logic flow diagram illustrating an example method of updating the shadows of the local file system by the synchronization client of a cloud-based collaboration platform. As illustrated, the synchronization client executes an action (e.g., rename, delete) on an item in the local file system that changes the state of the item from an old state to a new state at block 705. The synchronization client then updates one or more shadows of the local file system using the new state of the item at block 710. The synchronization client scans the local file system to determine the current state of the local file system at block 715 and determines any difference between the current state and the last known state of the local file system provided by the shadows of the local file system at block 720. At block 725, the synchronization client identifies, based on the difference, items for which synchronization events are to be generated.

Figure 8:
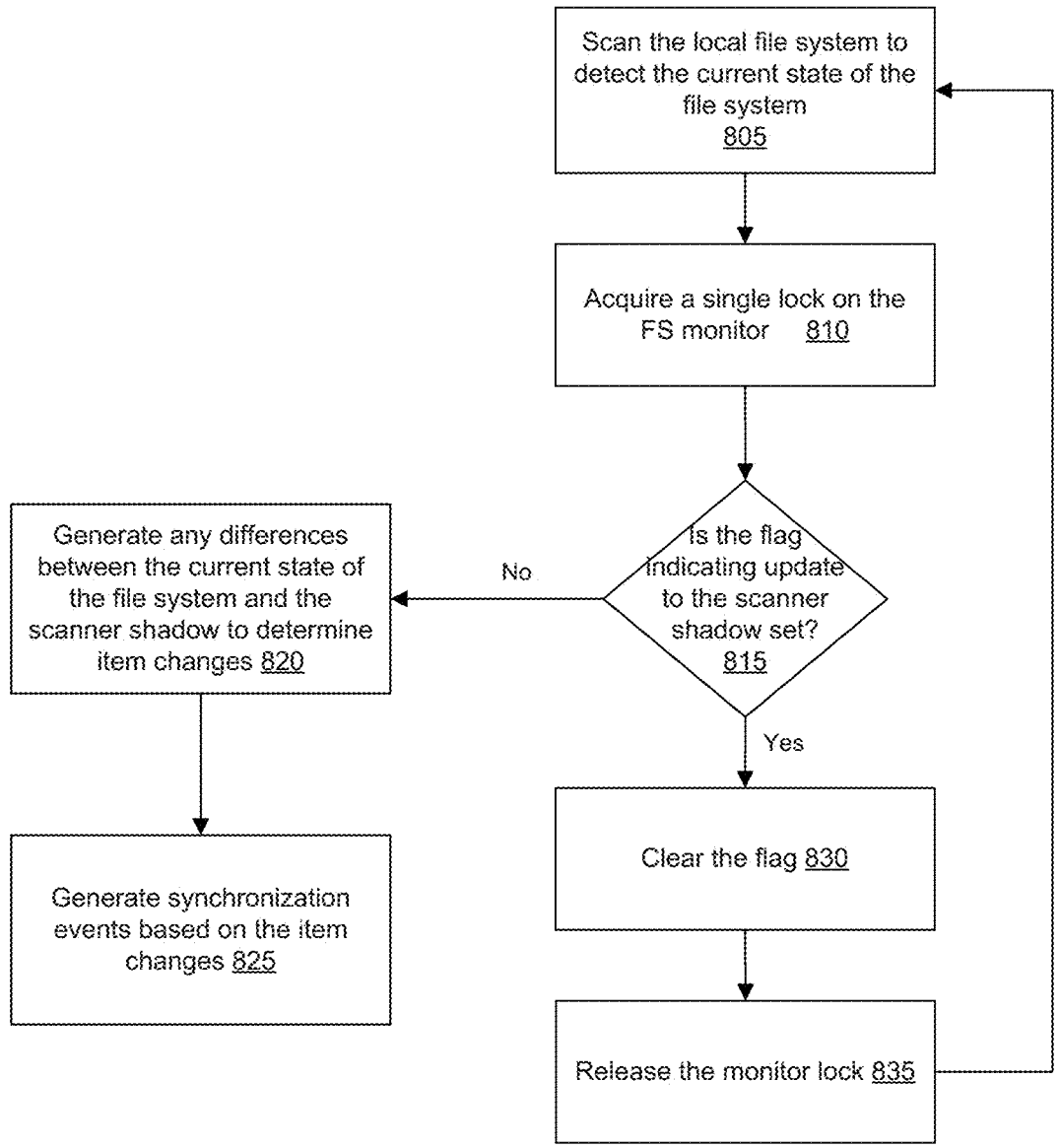
FIG. 8 depicts a logic flow diagram illustrating an example method of enhancing concurrency in the local file system by the synchronization client of a cloud-based collaboration platform.

FIG. 8 depicts a logic flow diagram illustrating an example method of enhancing concurrency in the local file system by the synchronization client of a cloud-based collaboration platform. As illustrated, at block 805, the synchronization client scans the local file system to detect the current state of the file system. At block 810, the synchronization client acquires a single lock on the file system monitor. At block 815, the synchronization client determines if the flag indicating update to the scanner shadow is set. if so, the synchronization client clears the flag at block 830 and releases the monitor lock at block 835. The synchronization client then rescans the local file system at block 805 to avoid making changes that are backward in time. If the flag is clear at block 815, the synchronization client generates any differences between the current state of the file system and the scanner shadow to determine item changes at block 820. The synchronization client then generates synchronization events based on the item changes at block 825.

Figure 9:
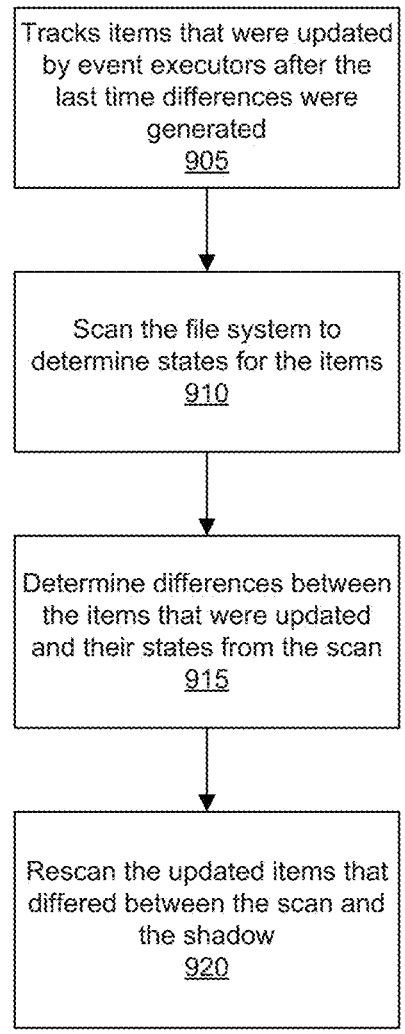
FIG. 9 depicts a logic flow diagram illustrating an example method of enhancing concurrency in the local file system by the synchronization client of a cloud-based collaboration platform.

FIG. 9 depicts a logic flow diagram illustrating an example method of enhancing concurrency in the local file system by the synchronization client of a cloud-based collaboration platform. The method tracks items that were updated by event executors after the last time differences were generated at block 905. The synchronization client then scans the file system to determine states for the items at block 910. The synchronization client determines differences between the items that were updated and their states from the scan at block 915. At block 920, the synchronization client rescans the updated items that differed between the scan and the shadow.

Figure 10:
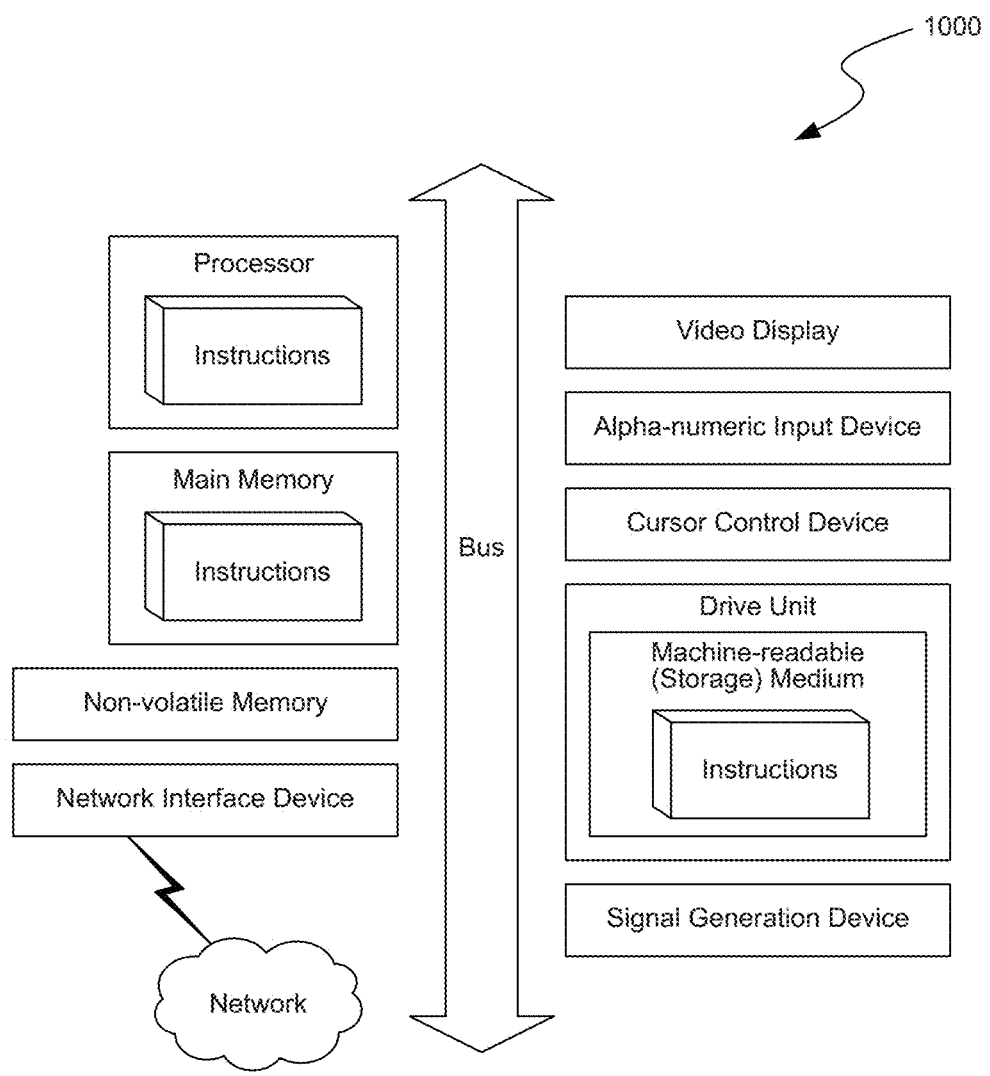
FIG. 10 depicts a diagrammatic representation of a machine in the example form of a computer system within which a set of instructions, for causing the machine to perform any one or more of the methodologies discussed herein, can be executed.

FIG. 10 shows a diagrammatic representation 1000 of a machine in the example form of a computer system within which a set of instructions, for causing the machine to perform any one or more of the methodologies discussed herein, can be executed.

In alternative embodiments, the machine operates as a standalone device or can be connected. (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or, more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1000 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects can likewise be embodied as a means-plus-function claim, or in other forms, such as being embodied in a computer-readable medium. (Any claim intended to be treated under 35 U.S.C. § 112, ¶6 begins with the words "means for".) Accordingly, the applicant reserves the right to add additional claims after filing the application to pursue such additional claim forms for other aspects of the disclosure.

We claim:

1. A method comprising:
  in response to detecting a change to a file or a folder in a local file system of a mobile device, generating file system notifications about the change, wherein the change to the file or the folder is indicated as a change of a state of the file or the folder from an old state to a new state;
  performing a partial scan of the local file system to identify other changes to files or folders in the local file system;
  generating a consistent snapshot representing a current state of the local file system when no updates are made to the local file system for a predetermined settle time;
  generating a reference snapshot representing a last known state of the local file system;
  determining a difference between the consistent snapshot and the reference snapshot;
  in response to the determined difference, updating the reference snapshot by merging the consistent snapshot on top of the reference snapshot; and
  generating one or more synchronization events based on the updated reference screenshot, wherein the one or more synchronization events bring a remote file system into synchronization with the local file system.

2. The method of claim 1, wherein generating the consistent snapshot includes:
  determining that a file or a folder in the local file system is not updated during a settle time interval; and
  generating the one or more synchronization events in response determining that a file or a folder in the local file system is not updated during a settle time interval.

3. The method of claim 1, wherein determining the difference between the consistent snapshot and the reference snapshot includes:
  determining identifiers corresponding to files or folders included in the reference snapshot and the consistent snapshot; and
  determining at least one identifier for a file or folder having a different state in the reference snapshot, wherein the at least one identifier is included in the identifiers corresponding to the files or the folders included in the reference snapshot and the consistent snapshot.

4. The method of claim 1, wherein overlaying the consistent snapshot on top of the reference snapshot for updating the reference snapshot includes:
  determining that the change to the file or the folder when applied to the local file system is consistent with a rest of the local file system.

5. The method of claim 4, wherein the change to the file or the folder corresponds to a deleted folder, wherein determining that the change is consistent includes:
  checking the reference snapshot to detect that the deleted folder does not have a child folder.

6. The method of claim 4, wherein the change to the file or the folder corresponds to a non-deleted file or a folder, wherein determining that the change is consistent includes:
  checking the reference snapshot to detect that the non-deleted file or the folder has a parent folder and that no other file or folder having a same name as the non-deleted file or the folder is included in the parent folder.

7. The method of claim 4, wherein the change to the file or the folder corresponds to a move of a file or a folder from one location to another, wherein determining that the change is consistent includes:
  checking the reference snapshot to detect that the move of the file or the folder does not cause the file or the folder to be an ancestor of a new parent folder.

8. The method of claim 1, further comprising:
  determining that the change to the file or the folder when applied to the local file system is not consistent with a rest of the local file system:
  buffering the change to the file or the folder until other changes cause the change to the file or the folder to be consistent with the last known state of the local file system.

9. The method of claim 8, further comprising:
  upon determining the change to the file or the folder is buffered for at least a timeout period, determining that (i) one or more changes to one or more files or folders are missed or (ii) one or more changes to one or more files or folders are corrupt.

10. The method of claim 1, wherein generating the one or more synchronization events comprises:
  producing raw events for execution on the local file system, wherein the raw events update one or more of a plurality of shadow copies of the local file system;
  generating, according to an order of the raw events, the one or more synchronization events to be placed in a sync event queue for serialized execution at a on the remote file system to bring the remote file system in sync with the local file system;
  maintaining a mapping between file system identifiers corresponding to the local file system into logical identifiers for executing the synchronization event at the remote file system; and
  translating file system identifiers corresponding to the local file system into logical identifiers.

11. The method of claim 10, wherein the raw events are identified by the file system identifiers corresponding to the local file system and wherein the file system identifiers corresponding to the local file system are subject to change.

12. A synchronization system comprising:
at least one hardware processor and
at least one memory comprising instructions configured to cause the at least one processor to perform a method comprising:
in response to detecting a change to a file or a folder in a local file system of a mobile device, generating file system notifications about the change, wherein the change to the file or the folder is indicated as a change of a state of the file or the folder from an old state to a new state;
performing a partial scan of the local file system to identify other changes to files or folders in the local file system;
generating a consistent snapshot representing a current state of the local file system when no updates are made to the local file system for a predetermined settle time;
generating a reference snapshot representing a last known state of the local file system;
determining a difference between the consistent snapshot and the reference snapshot;
in response to the determined difference, updating the reference snapshot by merging the consistent snapshot on top of the reference snapshot; and
generating one or more synchronization events based on the updated reference screenshot, wherein the one or more synchronization events bring a remote file system into synchronization with the local file system.

13. The system of claim 12, wherein overlaying the consistent snapshot on top of the reference snapshot for updating the reference snapshot includes:
determining that the change to the file or the folder when applied to the local file system is consistent with a rest of the local file system; and
generating the one or more synchronization events in response determining that a file or a folder in the local file system is not updated during a settle time interval.

14. The system of claim 13, wherein the change to the file or the folder corresponds to a deleted folder, wherein determining that the change is consistent includes:
checking the reference snapshot to detect that the deleted folder does not have a child folder.

15. The system of claim 13, wherein the change to the file or the folder corresponds to a non-deleted file or a folder, wherein determining that the change is consistent includes:
checking the reference snapshot to detect that the non-deleted file or the folder has a parent folder and that no other file or folder having a same name as the non-deleted file or the folder is included in the parent folder.

16. The system of claim 13, wherein the change to the file or the folder corresponds to a move of a file or a folder from one location to another, wherein determining that the change is consistent includes:
checking the reference snapshot to detect that the move of the file or the folder does not cause the file or the folder to be an ancestor of a new parent folder.

17. The system of claim 12, wherein generating the one or more synchronization events comprises:
producing raw events for execution on the local file system, wherein the raw events update one or more of a plurality of shadow copies of the local file system;
generating, according to an order of the raw events, the one or more synchronization events to be placed in a sync event queue for serialized execution at a on the remote file system to bring the remote file system in sync with the local file system;
maintaining a mapping between file system identifiers corresponding to the local file system into logical identifiers for executing the synchronization event at the remote file system; and
translating file system identifiers corresponding to the local file system into logical identifiers.

18. A non-transitory computer-readable storage medium storing instructions configured to cause at least one computing device to perform a method comprising:
in response to detecting a change to a file or a folder in a local file system of a mobile device, generating file system notifications about the change, wherein the change to the file or the folder is indicated as a change of a state of the file or the folder from an old state to a new state;
performing a partial scan of the local file system to identify other changes to files or folders in the local file system;
generating a consistent snapshot representing a current state of the local file system when no updates are made to the local file system for a predetermined settle time;
generating a reference snapshot representing a last known state of the local file system;
determining a difference between the consistent snapshot and the reference snapshot;
in response to the determined difference, updating the reference snapshot by merging the consistent snapshot on top of the reference snapshot; and
generating one or more synchronization events based on the updated reference screenshot, wherein the one or more synchronization events bring a remote file system into synchronization with the local file system.

19. The method non-transitory computer-readable storage medium of claim 18, further comprising:
determining that the change to the file or the folder when applied to the local file system is not consistent with a rest of the local file system:
buffering the change to the file or the folder until other changes cause the change to the file or the folder to be consistent with the last known state of the local file system.

20. The non-transitory computer-readable storage medium of claim 19, further comprising:
upon determining the change to the file or the folder is buffered for at least a timeout period, determining that (i) one or more changes to one or more files or folders are missed or (ii) one or more changes to one or more files or folders are corrupt.

* * * * *